Nov. 12, 1968

R. GENAHR ET AL 3,411,011

FIBER-OPTIC CABLE COMPRISING ROWS OF INTERLEAVED
LIGHT-CONDUCTING FIBERS WITH MASKING OF
FIBER PORTIONS IN ZONES COMMON
TO FIBERS OF ADJACENT ROWS

Filed Aug. 11, 1967

Rudolf Genähr
Kurt Brolde
INVENTORS.

BY Karl F. Ross
Attorney

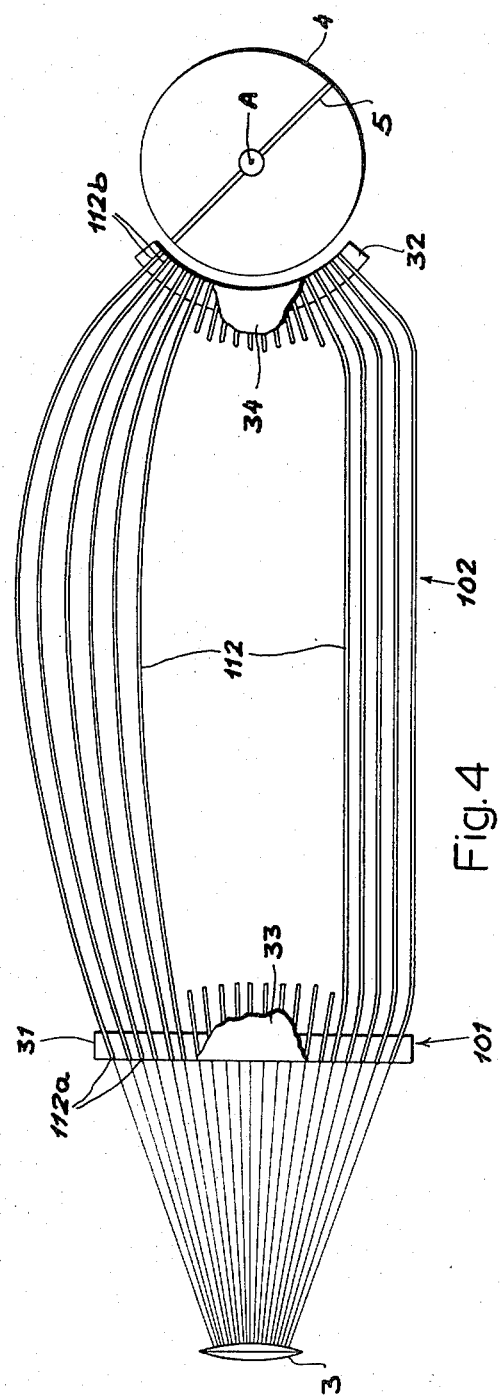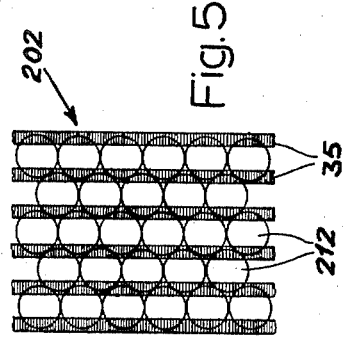

3,411,011
FIBER-OPTIC CABLE COMPRISING ROWS OF INTERLEAVED LIGHT-CONDUCTING FIBERS WITH MASKING OF FIBER PORTIONS IN ZONES COMMON TO FIBERS OF ADJACENT ROWS
Rudolf Genahr and Kurt Brolde, Bad Kreuznach, Germany, assignors to Jos. Schneider & Co., Optische Werke Kreuznach, Bad Kreuznach, Germany, a corporation of Germany
Continuation-in-part of application Ser. No. 571,035, Aug. 8, 1966. This application Aug. 11, 1967, Ser. No. 659,926
Claims priority, application Germany, Sept. 18, 1965, Sch 37,749; Aug. 17, 1966, Sch 39,414
1 Claim. (Cl. 250—227)

ABSTRACT OF THE DISCLOSURE

Fiber-optical transmission system wherein a flat cable composed of a multiplicity of light-transmissive fibers has a straight input end designed to receive a luminous image of an object to be measured, the output end of the cable being curved in a circular arc centered on an axis about which a disk, carrying one or more radial light conductors, is rotatable in the plane of the cable to scan the confronting terminations of the fibers and to pick up luminous impulses therefrom; advantageously, the extremities of the fibers extend radially toward the disk axis at the output end and similarly converge toward the source of illumination at the input end.

---

This application is a continuation-in-part of our pending application Ser. No. 571,035 filed Aug. 8, 1966.

Our present invention relates to a system for the transmission of luminous radiation and, more particularly, to a fiber-optical cable adapted to be used in such system.

An important field of use for fiber-optical cables is in the transmission of information which can be converted into digital pulses serving to register, for immediate visual reproduction (e.g. by means of a cathode-ray oscilloscope) and/or for storage on a recording medium, the analog of some measured quantity such as, for example, a physical dimension of a chosen object. This is especially useful where the object to be measured is not directly accessible for conventional measurements (e.g. because of intense heat or susceptibility to damage upon contact) so that its dimensions can be determined most conveniently from the shadow it casts or from an image of its own radiant body.

An object of this invention is to provide a cable of light-transmissive fibers adapted to serve as a measuring rule or yardstick for an area of distinct luminous intensity for the purpose set forth above.

Another object of our invention is the provision of improved means for transmitting the luminous output of such a measuring rule to a system for the storage and/or evaluation of the information received.

In accordance with an important aspect of the present invention, we provide a flat fiber-optical cable having one of its extremities shaped into a rigid bar along which the exposed ends of its light conductors are spaced according to a predetermined law, preferably uniformly with a convenient linear division of, say, 0.1 mm. In order to insure the necessary mechanical stability, the light conductors may have the form of flat ribbons which are stacked together with interposition of relatively stiff and opaque, advantageously metallic foils, these interposed foils being wider than the conductor ribbons so as to have overhanging portions between which another set of narrower but otherwise similar foils, of a thickness equaling that of the ribbons, are disposed to solidify the stack throughout a substantially rectangular cross-sectional area. The ribbons may consist of a resin matrix having a planar array of light-conductive fibers imbedded therein; this arrangement insures that one or more fibers at any division of the measuring bar can be torn or damaged without significantly affecting the output. The two sets of foils and the interleaved conductor ends, cemented together, form a deformation-resistant assembly at either end of the cable.

In an alternate construction, the ends of the ribbons may be inserted into slots of a comb-like holder, e.g. of metal, and imbedded in a plastic mass. It is also possible, for greater resolution, to imbed or otherwise assemble the the fiber ends side by side, without interposition of opaque dividers, and to juxtapose therewith a fine grid or raster optically dividing the fiber bundle into separate, ribbon-like zones.

Between the two rigid terminal assemblies, the conductor ribbons are quite flexible so that the cable can be readily bent along most of its length. This is especially advantageous where the incident luminous field is subject to considerable displacement.

The fiber ends remote from the source of incident light work into one or more photoelectric transducers, such as a photocell, and—in accordance with an important feature of our invention—are arrayed along an arc of a circle in the plane of the cable for consecutive sampling by one or more pickup elements, advantageously themselves constituted by light-conductive fibers which are rotatable about an axis passing through the center of the arc at right angles to the plane of the cable. The pick-up elements are advantageously carried on a disk coplanar with the cable end.

According to a more specific feature of our invention, the extremities of the fibers at the output end of the cable are not parallel but oriented radially, toward the center of the sweep circle, for maximum transmission of radiation over the full extent of the arc. A similar orientation of the fiber extremities, centered on the source of radiation (such as the exit pupil of a focusing objective), may be employed at the input end.

The invention will be described in greater detail with reference to the accompanying drawing in which:

FIG. 4 is a plan view of a cable and scanning disk in an arrangement similar to that of FIG. 1 but showing a different orientation of the light conductors; and FIG. 5, in an enlarged and somewhat diagrammatic view, illustrates the possibility of using closely bunched fibers with a juxtaposed grid.

Figure 1:
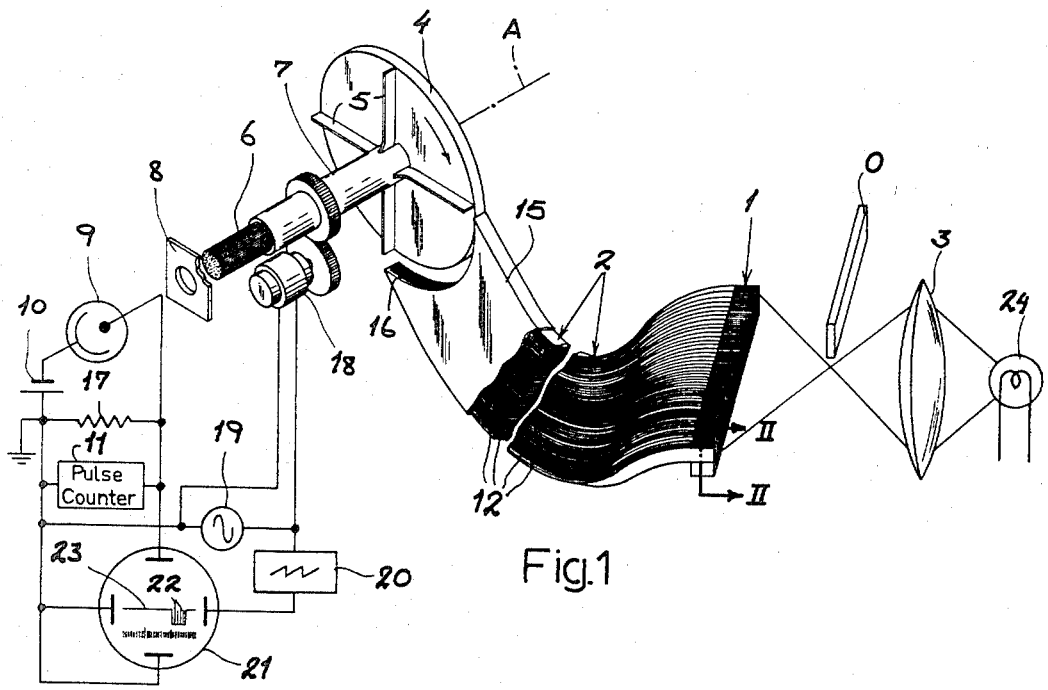
FIG. 1 is a somewhat diagrammatic view of a luminous transmission system incorporating our improved fiber-optical cable.

In FIG. 1 we have shown a fiber-optical cable 2 which terminates in a measuring rule 1 confronting a source of light here shown diagrammatically as a lamp 24 and an objective 3. Interposed between this light source and the cable extremity 1 is an elongated object O whose length is to be measured.

Cable 2 consists of a multiplicity of ribbon-shaped light conductors 12 which are enveloped, over most of their length, by a flexible sheath 15 of rubber or the like. The ends of these conductors remote from element 1 are arcuately cut off at 16 to form a quadrant centered on an axis A about which a disk 4 is rotatable. Disk 4 carries four light-conducting strands 5 which merge into an axial bundle 6 within a tubular shaft 7 supporting the disk.

The rear end of cable 6 confronts a photocell 9 energized from a source of current which has been indicated diagrammatically as a battery 10 and which, of course, may also include the usual amplifying equipment. A diaphragm 8 may be inserted between cable 6 and photocell 9.

Connected in the output circuit of photocell 9, in parallel with a resistor 17, is a pulse counter 11 which registers the number of light pulses picked up in rapid succession by the cell 9 as the disk 4 is rotated about its axis A by means of a motor 18 coupled with shaft 7. Motor 18 may be of the synchronous type driven from an alternating-current source 19 which also energizes the horizontal sweep circuit 20 of a monitoring cathode-ray oscilloscope 21, the vertical deflecting electrodes of the oscilloscope being shown connected across the output resistor 17 of the photocell.

In the operation of the system of FIG. 1 the shadow of object O falls on the measuring element 1 so that only a portion thereof is illuminated by the light source 3, 24. The radiation incident upon the illuminated ribbons 12 is converted into a train of discrete pulses as their exposed ends 16 are scanned by the rotating light conductors 5. With the physical arrangement illustrated, the cable 2 is scanned four times in immediate succession during each revolution of disk 4; sweep circuit 20 should, therefore, produce four sawtooth cycles per disk revolution and counter 11 should be similarly reset at every quarter turn of shaft 7. The luminous pulses are reproduced by the oscilloscope 21 in the form of negative spikes 22 and their number varies inversely with the length of the shadow cast by the object O, this length being thus indicated by the line 23 on the oscilloscope screen. The number of pulses registered during each quarter turn by the counter 11, or the complement of that number with reference to the total number of ribbons 12, may also be visually displayed and/or recorded on magnetic tape or some other suitable medium.

If the object O were luminous and imaged directly upon the cable extremity 1 by the lens 3 (with omission of lamp 24), the number of pulses registered by counter 11 and oscilloscope 21 would be directly proportional to the length of the object.

Figure 2:
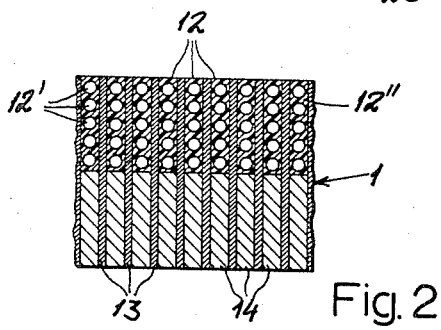
FIG. 2 is a sectional detail view of the cable taken on the line II—II of FIG. 1.

FIG. 2 illustrates in more detail the construction of the measuring bar 1 constituted by the input end of cable 2. The ribbons 12 are uniformly spaced from one another by interposed metal foils 13 of greater width, the overhanging portions of these foils being separated by other, narrower metal foils 14 having the same thickness as the ribbons 12 so that the resulting stack 12–14 has a rectangular profile. Ribbons 12 and foils 13, 14 are bonded together by a suitable cement, the relative stiffness of the foils imparting great rigidity to the bar 1. Each of the ribbons 12 will be seen to comprise a planar array of fibers 12' imbedded in a plastic matrix 12"; a similar composition may be used for the rotating light conductors 5 in FIG. 1.

In a specific instance, which is highly advantageous for the measuring of linear dimensions in metric units, the fibers 12' may have a diameter of about $50\mu$, the entire ribbon 12 being only slightly thicker (e.g. $60-70\mu$), while the combined thickness of a ribbon 12 and an adjacent foil 13 is exactly $100\mu$ corresponding to a division of ten light pulses per millimeter of length.

Figure 3:
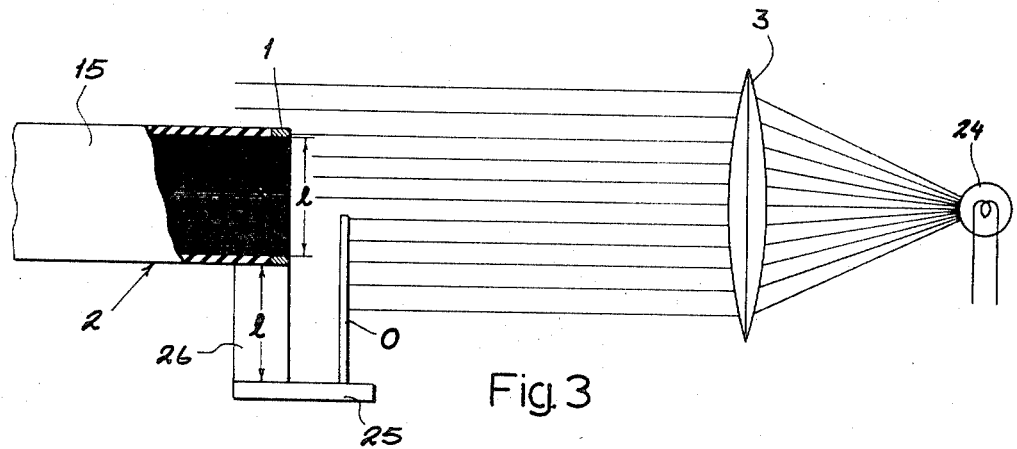
FIG. 3 is a diagrammatic plan view illustrating a slight modification of the arrangement shown in FIG. 1.

The flexibility of our improved cable 2 can be used to special advantage in an arrangement as shown in FIG. 3 wherein the object O has a length greater than that of measuring bar 1. The object O is shown there as resting against a stop 25 while a calibrated spacing block 26, of the same length $l$ as the bar 1, is interposed between this stop and the bar. Naturally, other spacers of length $2l$, $3l$, etc. may be similarly used for even longer objects. The length of the spacer must, of course, be taken into account in evaluating the information from counter 11 or indicator 21.

As shown in FIG. 4, a modified cable 102 consists of light conductors 112 whose input extremities 112a are curved to converge toward the source of illumination, i.e. the exit pupil of objective 3, while the output extremities 112b thereof are similarly bent in radial direction of the axis A of scanning disk 4 so as to be exactly aligned with the pick-up strands 5 thereof (only two of which are used in this embodiment) in any position of the disk. Since the rays from objective 3 also impinge axially upon each fiber 112, the effect of slanting incidence toward the ends of the rule 101 is eliminated and each fiber receives its full share of illumination.

To hold the fiber ends in the position described, a bar 31 of generally comb-like appearance is formed with slots receiving the ends 112a of the fibers while a similar but arcuately curved member 32 accommodates the ends 112b. A relatively opaque resinous mass 33, 34 envelops the fiber extremities and the members 31, 32 at each end between these extremities or may be similarly imbedded in opaque plastic material.

The opaque dividers separating the individual fiber ribbons, such as the foils 13 of FIG. 2 or the teeth of comb members 31, 32 in FIG. 4, may be omitted and replaced by a juxtaposed grid or raster as illustrated diagrammatically in FIG. 5. The cable 202 partly shown in that figure consists of a bundle of fibers 212 arrayed in adjoining and relatively offset layers, the junctions between these layers being overlain by the bars 35 of the grid which may be a physical structure or a set of opaque lines painted on the exposed fiber ends. If the cable end is of arcuate configuration, as shown at 16 in FIG. 1 or at 112b in FIG. 4, the grid 35 (if a physical structure) should of course be similarly curved. The grids at the two ends of the cable effectively convert the bundle of filaments 212 into an assembly of juxtaposed ribbons.

Naturally, the input end of the cable need not be flat, as shown in FIGS. 1 and 4, but may be arcuately curved about the center of incident radiation, such as the proximal principal point of objective 3, by substitution of a curved supporting member 32 for the straight comb 31. These and other modifications, readily apparent to persons skilled in the art, are intended to be embraced within the spirit and scope of our invention as defined in the appended claims.

We claim:

1. In a system for the transmission of luminous radiation, in combination, a flat fiber-optical cable comprising a bundle of light-conductive fibers extending from an input end to an output end of the cable, illuminating means at said input end, and light-responsive means at said output end, said fibers being closely packed in an interleaved pattern of overlapping rows at each of said ends forming an opaque grid of a parallel strips overlying overlapping zones of adjacent rows, each strip having a width less than a fiber diameter whereby said bundle is optically subdivided into a plurality of parallel ribbons, said light-responsive means being capable of scanning displacement relative to said output end in a direction perpendicular to said ribbons and being of an effective width in said direction to register with one ribbon at a time.

No references cited.

ROBERT SEGAL, *Primary Examiner.*